United States Patent
Broder et al.

(10) Patent No.: US 6,226,178 B1
(45) Date of Patent: May 1, 2001

(54) APPARATUS FOR COOLING A HEAT GENERATING COMPONENT IN A COMPUTER

(75) Inventors: Damon Broder, Austin; Charles D. Hood, III, Cedar Park, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/416,688

(22) Filed: Oct. 12, 1999

(51) Int. Cl.[7] .............................. H05K 7/20; F28D 15/00; G06F 1/20
(52) U.S. Cl. ..................... 361/687; 361/696; 361/697; 361/717; 62/259.2; 165/80.51; 165/104.33
(58) Field of Search .................................. 361/687–689, 361/694–703, 717–719; 437/209, 221, 222; 438/106, 118, 584, 675; 364/708.1; 29/832, 841, 854, 729, 739; 62/259.2; 165/80.3, 109.33, 80.4, 185, 104.21–104.26, 80.51, 104.29, 86

(56) References Cited

U.S. PATENT DOCUMENTS

| | | |
|---|---|---|
| 3,658,125 | 4/1972 | Freggens . |
| 3,739,234 | 6/1973 | Bylund . |
| 3,792,318 | 2/1974 | Fires . |
| 4,012,770 | 3/1977 | Pravada . |
| 4,747,450 | 5/1988 | Ikegame . |
| 4,931,905 | 6/1990 | Cirrito . |
| 5,339,214 * | 8/1994 | Nelson ................................ 361/695 |
| 5,365,749 * | 11/1994 | Porter ................................ 62/259.2 |
| 5,417,279 | 5/1995 | Wada . |
| 5,510,958 | 4/1996 | Shimabara . |
| 5,513,070 * | 4/1996 | Xie et al. ............................. 361/700 |
| 5,581,443 * | 12/1996 | Nakamura et al. ................... 361/705 |
| 5,606,341 * | 2/1997 | Aguilera ................................ 345/87 |
| 5,764,483 | 6/1998 | Ohashi . |
| 5,959,836 * | 9/1999 | Bhatia ................................ 361/687 |
| 5,964,279 * | 10/1999 | Mochizuki et al. ............ 165/104.33 |
| 5,966,286 * | 10/1999 | O'Connor et al. ................... 361/699 |
| 5,974,556 * | 10/1999 | Jackson et al. ...................... 713/322 |
| 6,038,128 * | 3/2000 | Hood, III et al. ................... 361/687 |
| 6,052,280 * | 4/2000 | Dilley et al. ........................ 361/687 |
| 6,058,009 * | 5/2000 | Hood, III et al. ................... 361/687 |
| 6,073,684 * | 6/2000 | Fiechter et al. ................. 165/104.33 |
| 6,097,597 * | 8/2000 | Kobayashi ........................... 361/687 |
| 6,111,748 * | 8/2000 | Bhatia ................................ 361/695 |
| 6,115,252 * | 9/2000 | Ohta et al. ........................... 361/700 |
| 6,122,167 * | 9/2000 | Smith et al. ........................ 361/687 |
| 6,125,035 * | 9/2000 | Hood, III et al. ................... 361/687 |

FOREIGN PATENT DOCUMENTS

| | | | |
|---|---|---|---|
| 11-153099 * | 11/1997 | (JP) | ............................. F04D/29/58 |
| 10-197172 * | 7/1998 | (JP) | ............................. F28D/15/02 |
| 11-330757 * | 11/1999 | (JP) | ............................. H05K/7/20 |

* cited by examiner

*Primary Examiner*—Leo P. Picard
*Assistant Examiner*—Anatoly Vortman
(74) *Attorney, Agent, or Firm*—Haynes and Boone, L.L.P.

(57) ABSTRACT

A computer including a microprocessor, an input coupled to provide input to the microprocessor, a mass storage coupled to the microprocessor and a memory coupled to the microprocessor to provide storage to facilitate execution of computer programs by the microprocessor. A heat pipe including spaced apart condenser regions and an evaporator region disposed between the condenser regions is provided. The evaporator region is positioned adjacent the microprocessor. A first heat dissipating device is attached to the heat pipe adjacent to a first one of the condenser regions. A second heat dissipating device is attached to the heat pipe adjacent to a second one of the condenser regions. The second heat dissipating device is of a different type than the first heat dissipating device. The reliability and effectiveness of the cooling apparatus are greatly increased through the use of a heat pipe having two condenser regions that are attached to different types of heat dissipating bodies.

20 Claims, 5 Drawing Sheets

APPARATUS FOR COOLING A HEAT GENERATING COMPONENT IN A COMPUTER

BACKGROUND

The disclosures herein relate generally to computers and more particularly to an apparatus for cooling a heat generating component in a computer.

Many computers include electronic components such as a microprocessor that generate a considerable amount of heat. The performance and operating life of these components are adversely affected by excessive temperatures. As a result, it is necessary to use a cooling apparatus to control the operating temperature of these types of heat generating components.

In a portable computer, due to space constraints, the use of a cooling apparatus to control the operating temperature of the microprocessor is essential. Furthermore, it is critical that the cooling apparatus employed in a portable computer has suitable reserve capacity to ensure that the operating temperature can be controlled in a wide range of operating conditions. If the microprocessor temperature is not kept within a required temperature range, the performance and possibly the effective life of the microprocessor will be adversely affected.

The cooling efficiency in a typical cooling system that utilizes a heat pipe and a heat dissipating device is a function of the effective contact area at the heat source and at the heat dissipation device. The cooling efficiency is also a function of the heat carrying capacity of the heat pipe. To increase the cooling capacity, two heat pipes may be connected in a parallel configuration between the heat source and the heat dissipating device. The dual heat pipe configuration has the advantage of increasing the contact area at the heat dissipating device and at the heat source. Dual heat pipe configurations also benefit from the heat carrying capacity of two heat pipes.

The use of multiple heat pipes has a number of disadvantages over a single heat pipe. The disadvantages include added weight, higher cost, and less than optimal placement of the two heat pipes at the microprocessor due to geometry constraints. In addition, when a thermal transfer plate is used to make contact at the microprocessor, the placement of the heat pipes forces some of the heat to travel in an indirect path through the thermal junction plate between the microprocessor and the heat pipes. The effect of the heat traveling indirectly to the heat pipes is that the thermal resistance is increased.

Tolerance build up with two or more heat pipes is also a problem. The heat pipes act together to locate the thermal transfer plate on top of the microprocessor. Inaccuracies in forming the heat pipes can lead to a skewed relationship between the microprocessor and the thermal transfer plate. The skewed relationship results in increased thermal resistance and possibly excessive stress on the microprocessor, causing it to fracture.

U.S. Pat. No. 5,881,298 discloses a portable computer that conserves power when the computer operates from its portable power source. The portable computer has a processor operatively coupled to an input device, an output device, and a memory device. The portable computer also includes a portable power source operatively coupled to the processor, and a selectively operable cooling system that is adapted to create a heat transfer zone in which heat dissipates from the processor. The cooling system has a cooling unit that may be selectively disabled in a desired power-saving mode during which the processor may continue to operate. The cooling unit is preferably disabled by electrically disconnecting the cooling unit from the portable power source to de-energize the cooling system, or by physically disconnecting the cooling system from the portable computer.

U.S. Pat. No. 5,764,483 discloses a heat dissipating apparatus for efficiently transporting heat generated by components to a wall of a metal box that serves as a heat dissipation section. The heat generating components and the heat dissipation section are connected to each other through a thermal transport device having a flexible structure. The components and the box are connected to each other irrespective of the arrangement of components such that heat is efficiently transported by a liquid. In the heat dissipation section, because the components and the wall of the metal box are thermally connected to each other, a high heat dissipation capacity is obtained as heat is diffused extensively into the wall due to a high thermal conductivity of the metal box.

U.S. Pat. No. 5,339,214 discloses a computer chassis assembly that includes a heat pipe which thermally couples an electronic package to multiple fan units. The heat pipe provides a computer chassis that sufficiently cools internal heat generating components without placing the components in close proximity to the fans.

U.S. Pat. No. 4,931,905 discloses a cooling apparatus having two metal plates including U-shaped grooves formed therein. The plates form congruent halves wherein matching grooves complete independent heat pipes. The bight section of each heat pipe serves as an evaporator section while the parallel arms of each heat pipe form condenser sections.

U.S. Pat. No. 3,792,318 discloses an improved cooling apparatus for flat semiconductors in which the semiconductor is held between two base members. Each one of the two base members has one or more heat pipes inserted into holes formed therein. Heat is conducted by the vaporized working fluid in the heat pipe from the end inserted into the base member to other end which contains cooling fins which condense the vapor. Once in a liquid form, it then returns by capillary action through a wick. The cooling fins may be located remote from the semiconductor to take advantage of more favorable cooling conditions.

U.S. Pat. No. 3,786,861 discloses a heat pipe comprising a fluid-tight container for transferring heat from a source adjacent to an evaporation region to a sink adjacent to a condenser region. The heat pipe also includes a passage for transferring vapor from the evaporator region to the condenser region, and a wick having high heat conductivity for transferring condensate from the condenser region back to the evaporator region by capillary pumping. The wick also conducts heat from the container in the evaporator region to the evaporation sites, and from the condensation sites to the container in the condenser region. The wick comprises a bundle-like arrangement of substantially direct, parallel, substantially uniform capillary channels.

Until recently, portable computers have typically used a single heat pipe. The use of two or more heat pipes increases the cooling capacity. However, the disadvantages presented above limit the overall effectiveness of a multiple heat pipe cooling system. The power consumption of computer-related heat generating components such as microprocessors continues to increase, and the size of portable computers continues to decrease. As a result, a more robust cooling apparatus for portable computers is needed to ensure that a suitable operating temperature for heat generating components such as the microprocessor is maintained.

Accordingly, there is a need for a cooling apparatus that overcomes the shortcomings of previous cooling systems and techniques.

SUMMARY

One embodiment, accordingly, provides a cooling system that includes at least two different types of heat dissipating devices having a single heat routing member attached between them. To this end, one embodiment provides a cooling system for a computer including a heat pipe having spaced apart condenser regions with an evaporator region disposed therebetween. A first heat dissipating device is attached to the heat pipe adjacent to a first one of the condenser regions. A second heat dissipating device is attached to the heat pipe adjacent to a second one of the condenser regions. The second heat dissipating device is a different type than the first heat dissipating device.

A principal advantage is that the reliability and effectiveness of the cooling system are greatly increased through the use of a heat pipe having two or more condenser regions that are attached to different types of heat dissipating devices.

BRIEF DESCRIPTION OF THE DRAWING FIGURES

DETAILED DESCRIPTION

Figure 1:
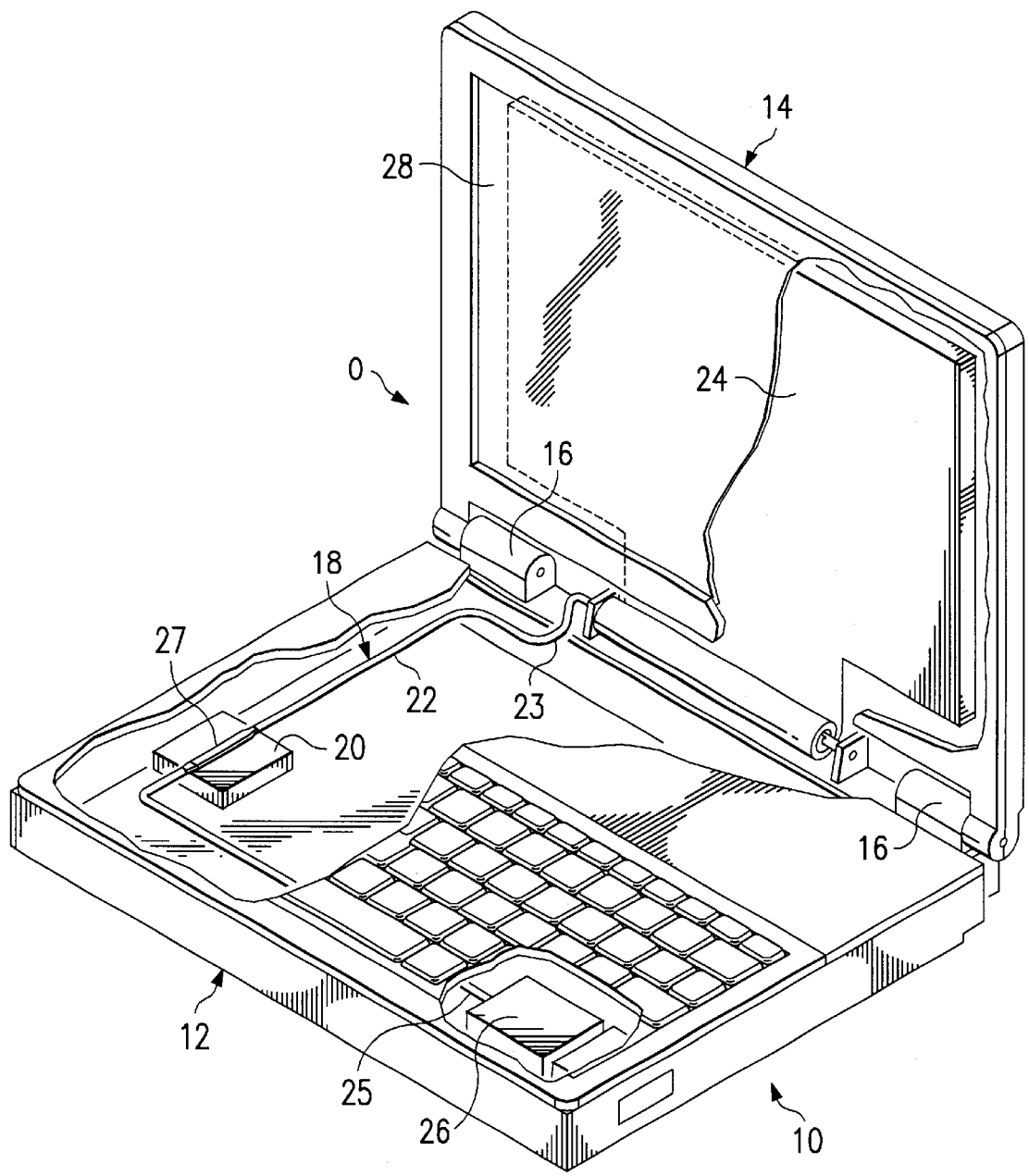
FIG. 1 is a perspective view illustrating an embodiment of a cooling apparatus mounted in both a top portion and a base portion of a portable computer, the top portion shown in an open position.
Figure 2:
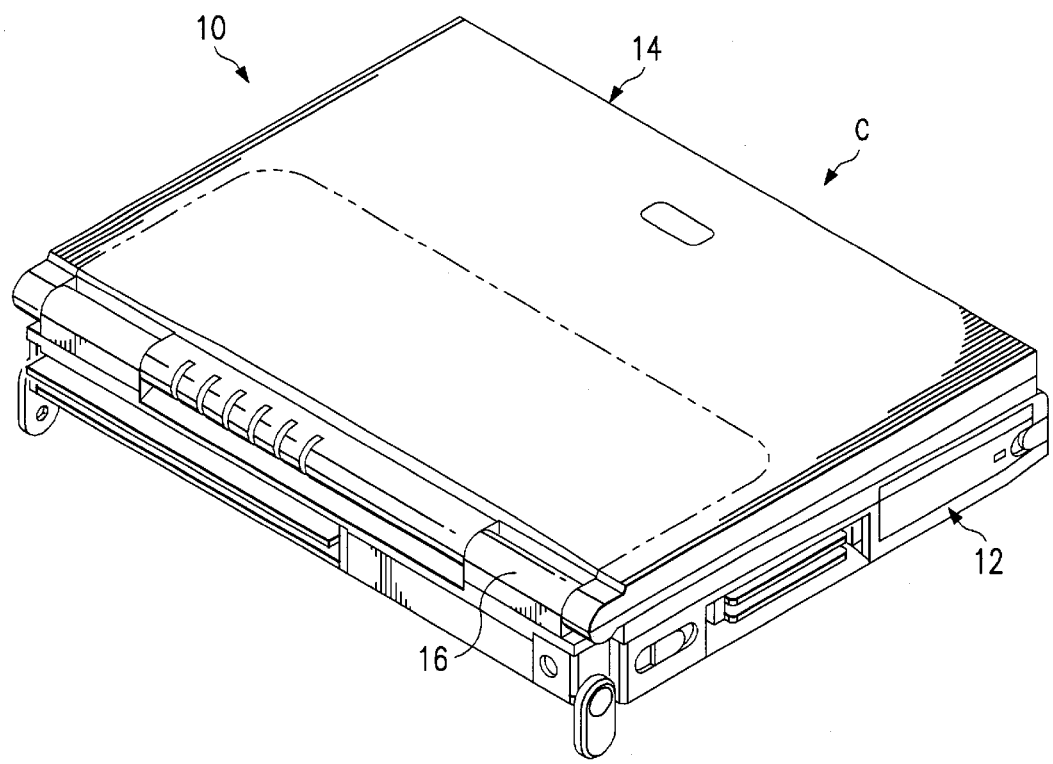
FIG. 2 is a perspective view illustrating the portable computer of FIG. 1 with the top portion in the closed position.

An embodiment of a portable computer 10 having a chassis including a base portion 12 and a top portion 14 is illustrated in FIGS. 1 and 2. The top portion 14 is pivotally attached to the base portion 12 by hinges 16. The top portion 14 may be pivoted between an open position O, FIG. 1, and a closed position C, FIG. 2.

Referring to FIG. 1, the portable computer 10 includes a cooling apparatus 18 for maintaining a heat generating component 20 such as a microprocessor, at a desired operating temperature. The cooling apparatus 18 includes a heat routing member 22 such as a heat pipe, a first heat dissipating device 24 and a second heat dissipating device 26.

The first heat dissipating device 24 is mounted in the top portion 14 behind a display portion 28. The second heat dissipating device 26 is connected in the base portion 12. The heat routing member 22 is pivotally connected to the first heat dissipating device 24, for example in a channel 24a, to accommodate movement of the top portion 14 between the open position O and closed position C. Various techniques for pivotally connecting a heat dissipating device to a heat routing member are known in the art.

A key aspect of the present disclosure is to provide a cooling apparatus that includes a plurality of heat dissipating devices connected to a common heat routing member. Furthermore, it is also a key aspect of the present disclosure that the plurality of heat dissipating devices be of different types. For example, the first one of the heat dissipating devices 24 may be a passive type of device such as a heat dissipating panel and the second one of the heat dissipating devices 26 may be an active type such as a forced convection heat exchanger.

A heat dissipating panel is often constructed from a piece of aluminum sheet configured to be located in the top portion of the computer behind a display unit 28. Forced convection heat exchangers are well known in the art. A typical forced convection heat exchanger includes a heat sink and an electrically powered fan positioned to direct a stream of air over the heat sink. Heat pipes and heat dissipating panels are commercially available from a variety of sources such as Thermacore Incorporated, Lancaster, Pa. 17601, USA. Fans and heat sinks for fabricating forced convection heat exchangers are commercially available from sources such as Indek Corporation, 1239 Reamwood Ave, Sunnyvale, Calif. 94089, USA.

By providing a cooling apparatus including a plurality of heat dissipating devices, auxiliary and redundant modes of cooling may be provided. Redundant and auxiliary cooling capabilities are particularly valuable in portable computers having one or more high performance microprocessors that generate a considerable amount of heat. These types of heat generating components must be operated within a specified operating temperature range to exhibit maximum performance.

In applications where the extent of use of the computer and the ambient temperature permit, a passive cooling device such as a heat dissipating panel will often provide sufficient heat dissipation for maintaining the heat generating component at a suitable operating temperature. However, under extreme ambient conditions and intensive computer usage, the heat dissipating characteristics of a passive heat dissipating device may not be sufficient for maintaining the heat generating component at a suitable operating temperature. In embodiments according to the present disclosure, an active heat dissipating device may be operated to provide additional heat transfer.

Figure 3:
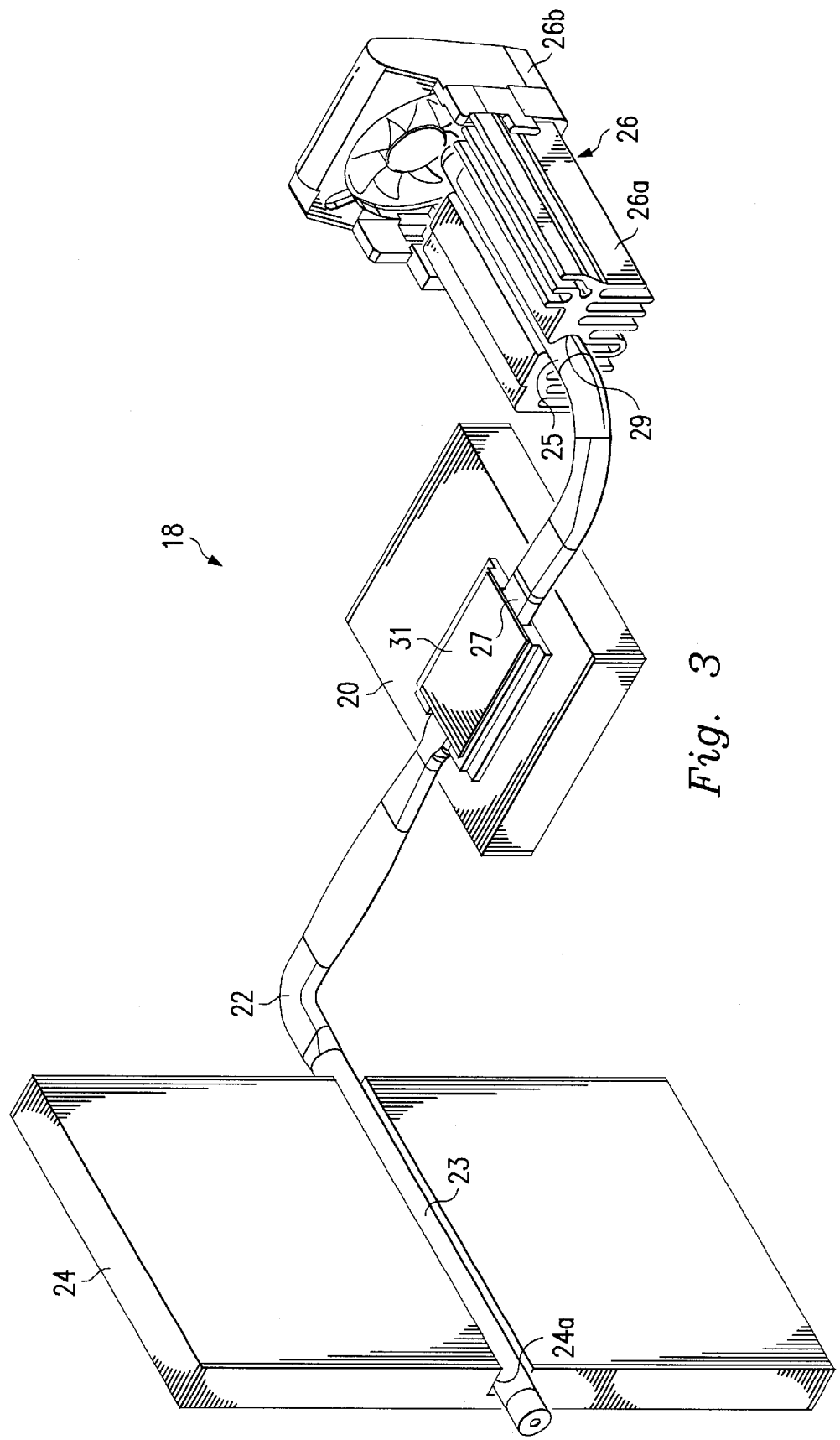
FIG. 3 is a perspective view illustrating an embodiment of a cooling apparatus including two different types of heat dissipating devices.

An embodiment of the cooling apparatus 18 is illustrated in FIG. 3. The heat routing member 22 includes a first heat dissipating portion 23 attached to the first heat dissipating device 24, a second heat dissipating portion 25 attached to the second heat dissipating device 26 and a heat absorption portion 27. The heat absorption portion 27 may be mounted in direct contact with the heat generating component 20 or be mounted indirectly through a heat spreading device such as a heat plate 31. The heat absorption portion 27 is disposed between the first and second heat dissipating portions 23, 25. When the heat routing member 22 is a heat pipe, the heat dissipating portions 23, 25 are condenser regions and the heat absorption dissipation portion 27 is an evaporator region. The second heat dissipating device 26 includes a heat sink 26a and a powered fan assembly 26b. The powered fan assembly 26b is positioned to direct a stream of air over the heat sink 26a. The heat sink 26a includes a channel 29 for receiving the second heat dissipating portion 25 of the heat routing member 22.

Figure 4:
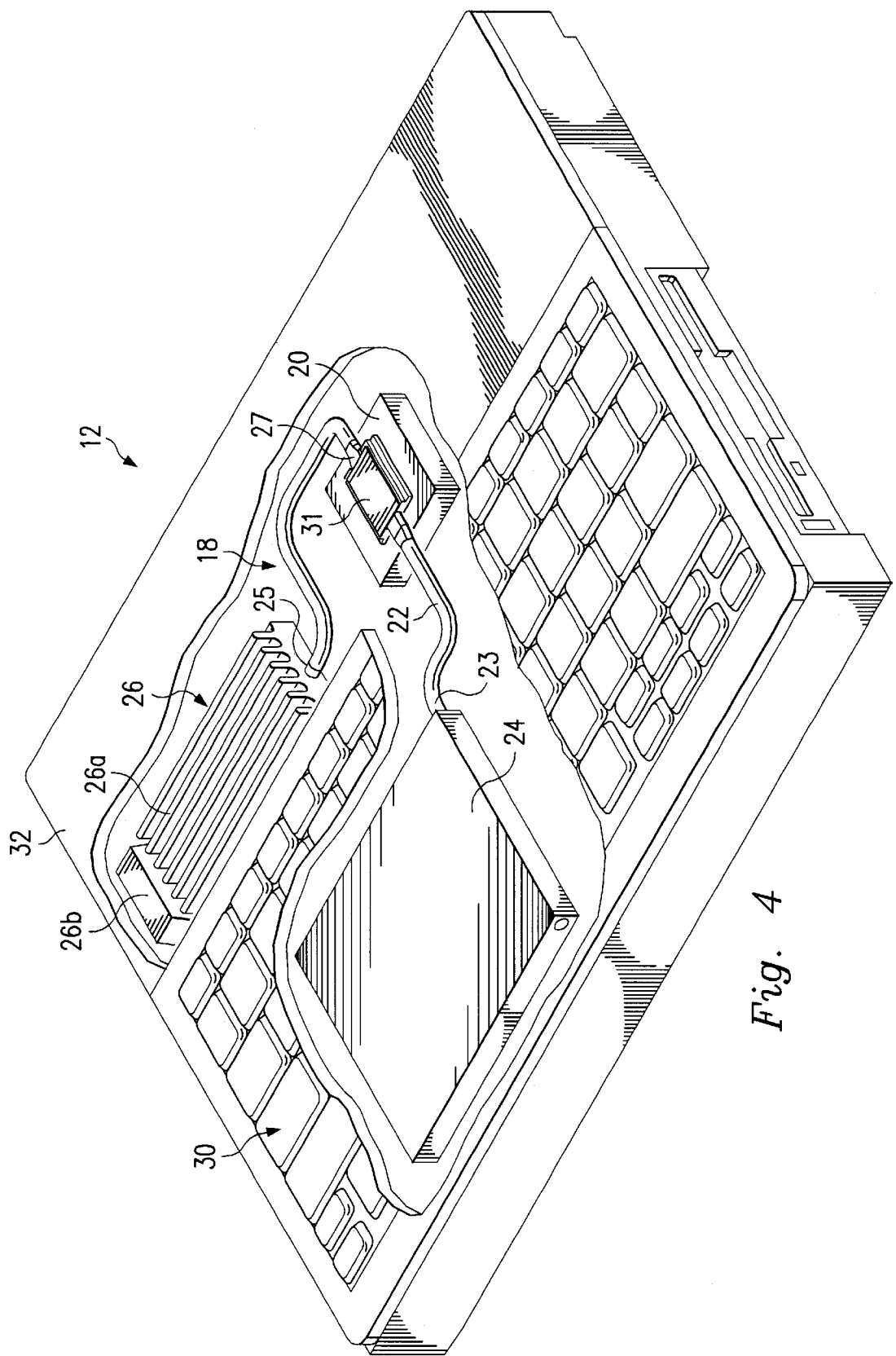
FIG. 4 is a perspective view illustrating an embodiment of a cooling apparatus mounted in the base portion of the portable computer of FIG. 1.

In another embodiment of the cooling apparatus, FIG. 4, the cooling apparatus 18 is contained entirely within the base portion 12 of the portable computer 10. The first heat dissipating device 24 is located adjacent to a keyboard portion 30 of the base 12. In addition to providing a heat dissipating function, the first heat dissipating device may be formed to serve as a keyboard support member or other structural member within the computer. The second heat dissipating device 26 may be positioned adjacent to the first heat dissipating device 24 or at a remote location within the base 12. When the second heat dissipating device 26 is a forced convection heat exchanger, it will be desirable to position the second heat dissipating device 26 adjacent to an edge portion 32 of the base 12 to allow adequate airflow into the base portion 12, through the cooling apparatus 18 and back out of the base portion 12.

Figure 5:
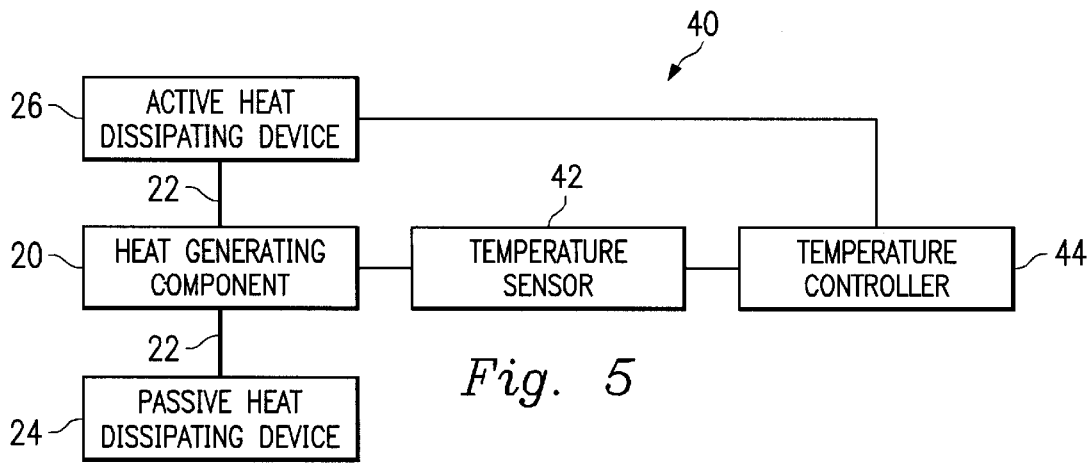
FIG. 5 is a block diagram illustrating an embodiment of a temperature control system.

An embodiment of a temperature control system 40 is illustrated in FIG. 5. The temperature control system 40 includes a temperature sensor 42 connected between the heat generating component 20 and a temperature controller 44. The active heat dissipating device 26 and the passive heat dissipating device 24 are connected to the heat generating device 20 by the heat pipe 22. The temperature controller 44 is connected between the temperature sensor 42 and the active heat dissipating device 26. The temperature sensor 42 provides a temperature input signal to the temperature controller 44. When the temperature of the heat generating component 20 exceeds a specified limit, the temperature controller 44 activates or enables the activation of the active heat dissipating device 26 such that additional heat may be dissipated from the heat generating component 20 to reduce its temperature below the specified limit.

Figure 6:
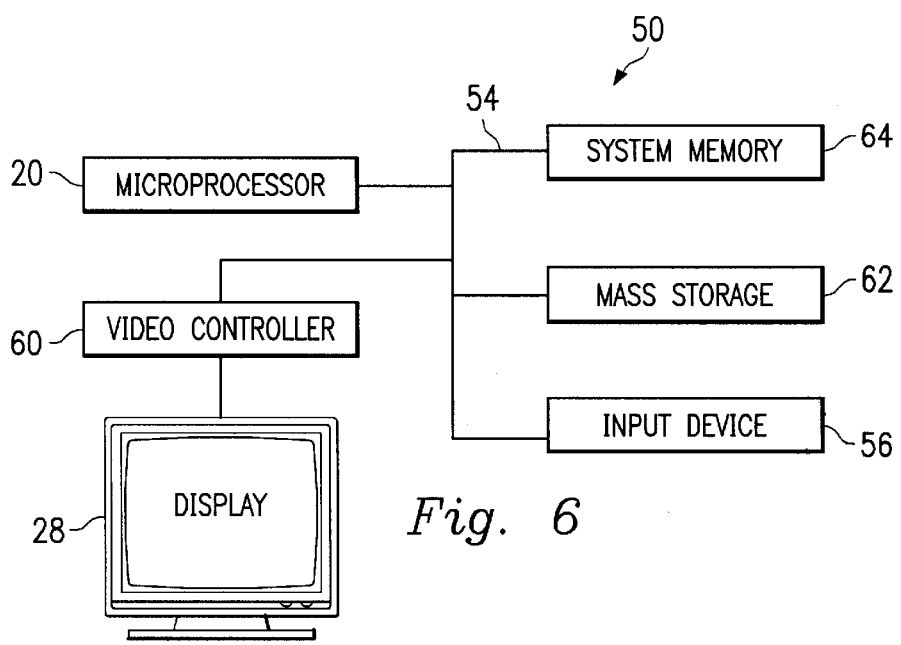
FIG. 6 is a block diagram illustrating an embodiment of a computer system.

An embodiment of a computer system 50 is illustrated in FIG. 6. The computer system 50 includes at least one microprocessor 20. The microprocessor 20 is connected to a bus 54. The bus 54 serves as a connection between the microprocessor 20 and other components of the computer system 50. One or more input devices 56 may be coupled to the microprocessor 20 to provide input to the microprocessor 20. Examples of input devices include keyboards, touchscreens, and pointing devices such as a mouse, a trackball and a trackpad. The computer system 50 may also include a display 28 which is coupled to the microprocessor 20 typically by a video controller 60. Programs and data are stored on a mass storage device 62 which is coupled to the microprocessor 62. Mass storage devices include components such as hard disks, optical disks, magneto-optical drives, floppy drives, and the like. A system memory 64 provides the microprocessor 20 with fast storage to facilitate execution of computer programs by the microprocessor 20. It should be understood that other busses and intermediate circuits can be employed between the components described above and microprocessor 20 to facilitate interconnection between the components and the microprocessor 20.

One embodiment provides a cooling system for a computer including a heat pipe having a plurality of spaced apart condenser regions with an evaporator region disposed therebetween. A first heat dissipating device is attached to the heat pipe adjacent to a first one of the condenser regions. A second heat dissipating device attached to the heat pipe adjacent to a second one of the condenser regions. The second heat dissipating device is a different type than the first heat dissipating device.

Another embodiment provides a cooling apparatus including an elongated fluid-tight container for transferring heat therethrough from an evaporator region thereof to spaced apart condenser regions thereof. The evaporator region is disposed between the condenser regions. The container extends between a first one of the condenser regions and the evaporator region, and a second one of the condenser regions and the evaporator region. A first heat dissipating device is attached to the container adjacent to the first one of the condenser regions. A second heat dissipating device is attached to the container adjacent to the second one of the condenser regions. The second heat dissipating device is of a different type than the first heat dissipating device.

Yet another embodiment provides a computer including a microprocessor mounted in a chassis, an input coupled to provide input to the microprocessor, a mass storage coupled to the microprocessor and a memory coupled to the microprocessor to provide storage to facilitate execution of computer programs by the microprocessor. A heat pipe including a plurality of spaced apart condenser regions and an evaporator region disposed between the condenser regions is provided. The evaporator region is positioned adjacent to the microprocessor for extracting heat therefrom. A first heat dissipating device is attached to the heat pipe adjacent to a first one of the condenser regions. A second heat dissipating device is attached to the heat pipe adjacent to a second one of the condenser regions. The second heat dissipating device is of a different type than the first heat dissipating device.

A further embodiment provides a method of cooling a heat generating component in a computer. The method includes forming a heat pipe including spaced apart condenser regions and an evaporator region disposed between the condenser regions. The evaporator region of the heat pipe is then attached to the heat generating component. Next, a passive heat dissipating device is attached to the heat pipe adjacent to a first one of the condenser regions and an active heat dissipating device is attached to the heat pipe adjacent to a second one of the condenser regions. In response to the heat generating component exceeding a maximum temperature, the active heat dissipating device is activated.

As it can be seen, the embodiments presented herein provide several advantages. A plurality of heat dissipating bodies can be employed in a portable computer. Different types heat dissipating bodies can be employed. The heat dissipating bodies can be positioned at different locations. The heat transfer at the heat generating component can be enhanced. The heat carrying capacity of a single heat pipe is increased. Tolerance build-up associated with two heat pipes is dramatically reduced.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cooling system for a computer, comprising:
    a heat pipe including spaced apart condenser regions with an evaporator region disposed therebetween;
    a first heat dissipating device attached to the heat pipe adjacent to a first one of the condenser regions; and
    a second heat dissipating device attached to the heat pipe adjacent to a second one of the condenser regions, the second heat dissipating device being of a different type than the first heat dissipating device.

2. The system of claim 1 wherein the first heat dissipating device passively dissipates heat and the second heat dissipating device actively dissipates heat.

3. The system of claim 2 wherein the first heat dissipating device includes means for dissipating heat using unforced convection and the second heat dissipating device includes means for dissipating heat using forced convection.

4. The system of claim 2 wherein the second heat dissipating device includes a heat sink and a powered fan positioned to direct a stream of air over the heat sink, the powered fan being activated when a maximum temperature level at the evaporator region is exceeded.

5. The system of claim 1 further comprising a cooling controller, the cooling controller including means for sensing an evaporator region temperature and for enabling operation of the second heat dissipating device when a maximum temperature level at the evaporator region has been exceeded.

6. The system of claim 1 wherein the first heat dissipating device includes a heat diffusing panel and wherein the second heat dissipating device includes a forced convection heat exchanger.

7. The system of claim 6 wherein the heat exchanger includes a heat sink and a powered fan positioned to direct a stream of air over the heat sink.

8. The system of claim 6 wherein the heat diffusing panel is integrally formed with a structural component of the computer.

9. The system of claim 1 wherein the first heat dissipating device is positioned at a first location in the computer and the second heat dissipating device is positioned at a second location.

10. The system of claim 9 wherein the first location is in a top portion of the computer and the second location is in a base portion of the computer.

11. The system of claim 10 wherein the first heat dissipating device includes a heat diffusing panel and wherein the second heat dissipating device includes a forced convection heat exchanger.

12. The system of claim 10 wherein the heat pipe and the first heat dissipating device define a hinge between the top and base portions of the computer, the hinge enabling the top to be moved between an open position and a closed position.

13. The system of claim 1 wherein the evaporator region of the heat pipe is in direct contact with a heat generating component of the computer.

14. A cooling apparatus, comprising:
   an elongated fluid-tight container for transferring heat therethrough from an evaporation region thereof to spaced apart condenser regions thereof, the evaporator region disposed between the condenser regions;
   the container extending between a first one of the condenser regions and the evaporator region;
   the container extending between a second one of the condenser regions and the evaporator region;
   a first heat dissipating device attached to the container adjacent to the first one of the condenser regions; and
   a second heat dissipating device attached to the container adjacent to the second one of the two condenser regions, the second heat dissipating device being of a different type than the first heat dissipating device.

15. A computer system, comprising:
   a chassis;
   a microprocessor mounted in the chassis;
   an input coupled to provide input to the microprocessor;
   storage coupled to the microprocessor;
   a memory coupled to the microprocessor to provide storage to facilitate execution of computer programs by the microprocessor;
   a heat pipe including a plurality of spaced apart condenser regions and an evaporator region disposed between the condenser regions, the evaporator region positioned adjacent to the microprocessor for extracting heat therefrom;
   a first heat dissipating device attached to the heat pipe adjacent to a first one of the condenser regions; and
   a second heat dissipating device attached to the heat pipe adjacent to a second one of the condenser regions, the second heat dissipating device being of a different type than the first heat dissipating device.

16. The computer system of claim 15 wherein the evaporator region of the heat pipe is in direct contact with the microprocessor.

17. The computer system of claim 15 wherein the first heat dissipating device is positioned in a top portion of the computer and the second heat dissipating device is positioned in a base portion of the computer.

18. The computer system of claim 17 wherein the first heat dissipating device includes a heat diffusing panel and wherein the second heat dissipating device includes a forced convection heat exchanger.

19. The computer system of claim 17 wherein the heat pipe is integrally formed with a hinge between the top portion and the base portion.

20. A method of cooling a heat generating component in a computer, comprising the steps of:
   forming a heat pipe including spaced apart condenser regions and an evaporator region disposed between the condenser regions;
   positioning the evaporator region of the heat pipe adjacent to a heat generating component;
   attaching a passive heat dissipating device to the heat pipe adjacent to a first one of the condenser regions;
   attaching an active heat dissipating device to the heat pipe adjacent to a second one of the condenser regions; and
   in response to the heat generating component exceeding a maximum temperature, activating the active heat dissipating device.

* * * * *